United States Patent
Piermartini

(10) Patent No.: US 7,172,475 B2
(45) Date of Patent: Feb. 6, 2007

(54) NAVAL PROPULSION SYSTEM FED BY REFUSE DERIVED FUEL AND METHOD THEREOF

(75) Inventor: Franco Piermartini, Fabriano AN (IT)

(73) Assignee: Worldwide Ecological Shipping & Transport West, Luxembourg (LU)

(*) Notice: Subject to any disclaimer, the term of this patent is extended or adjusted under 35 U.S.C. 154(b) by 47 days.

(21) Appl. No.: 10/510,650

(22) PCT Filed: Apr. 8, 2002

(86) PCT No.: PCT/IT02/00217

§ 371 (c)(1),
(2), (4) Date: Oct. 8, 2004

(87) PCT Pub. No.: WO03/084809

PCT Pub. Date: Oct. 16, 2003

(65) Prior Publication Data

US 2005/0142960 A1    Jun. 30, 2005

(51) Int. Cl.
  *B63H 1/30* (2006.01)
(52) U.S. Cl. ...................................................... 440/13
(58) Field of Classification Search .................. 440/13
  See application file for complete search history.

(56) References Cited

U.S. PATENT DOCUMENTS 4,471,744 A * 9/1984 Holtz .......................... 123/514
4,796,544 A * 1/1989 Overgaard .................... 110/196

FOREIGN PATENT DOCUMENTS

DE   3542911 A1 * 6/1987

* cited by examiner

*Primary Examiner*—Jesús D. Sotelo
(74) *Attorney, Agent, or Firm*—Leffert Jay & Polglaze, P.A.

(57) ABSTRACT

Naval propulsion system (1), comprising a heating chamber (6), apt to be fired with refuse derived fuel, an extraction unit (3, 5) apt to extract the fuel in the form of bales housed in containers to feed it towards the heating chamber, and a unit (4) for reducing the bales to the form of fluff, positioned upstream of the heating chamber.

22 Claims, 3 Drawing Sheets

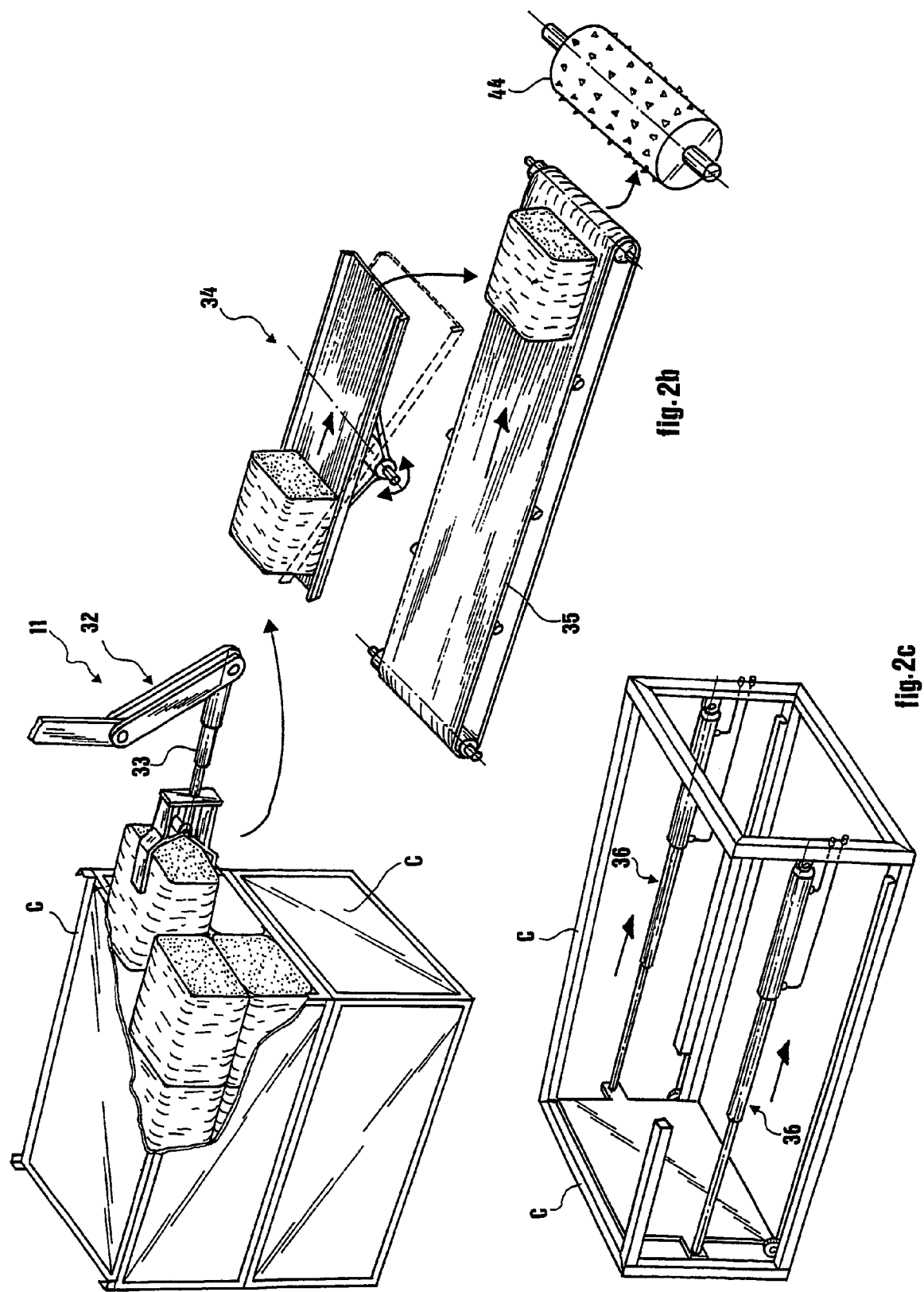

NAVAL PROPULSION SYSTEM FED BY REFUSE DERIVED FUEL AND METHOD THEREOF

Figure 1:
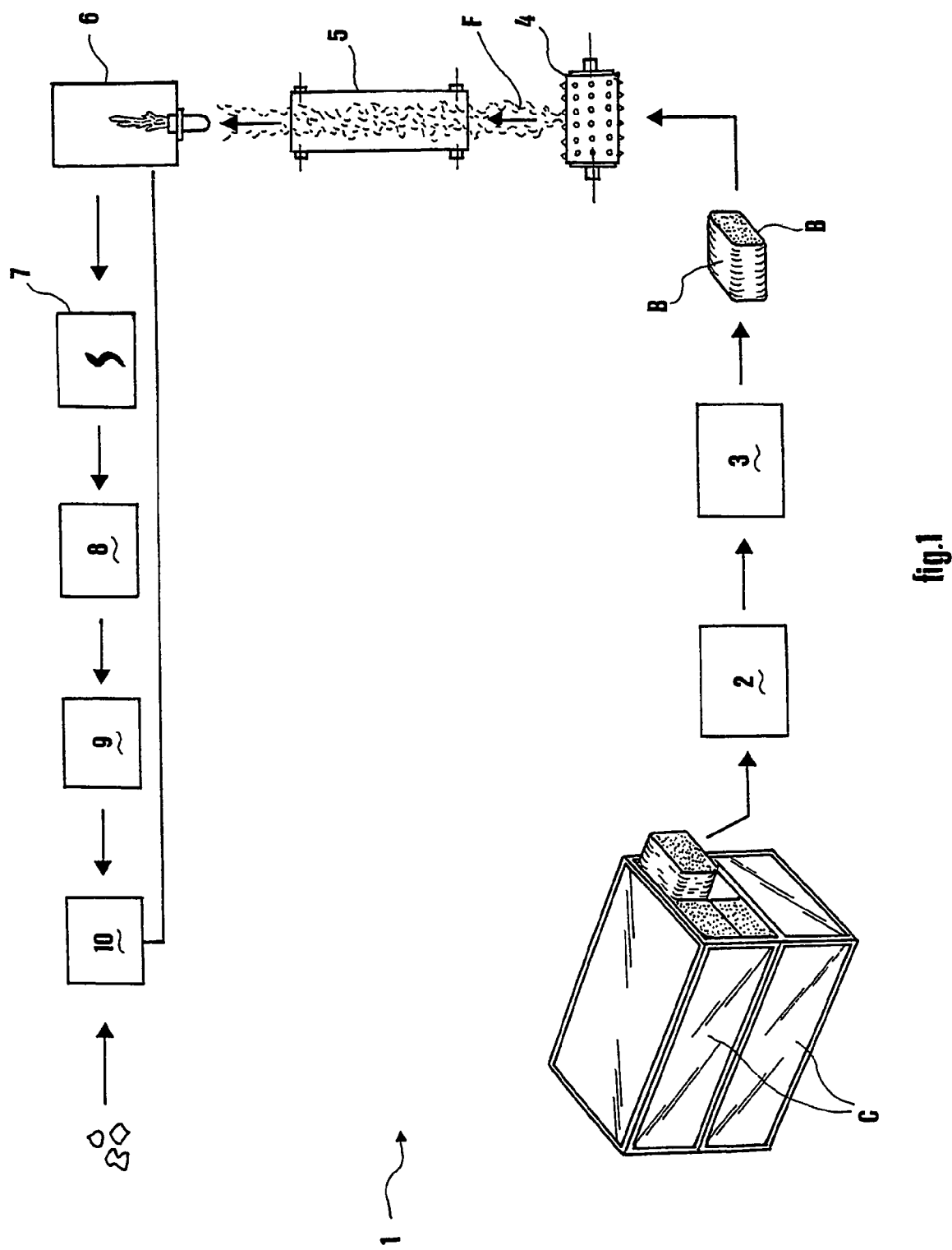

The present invention relates to a naval propulsion system fired with non conventional fuel derived from refuse and/or work process scraps and to a method related thereto.

Use is known of fuel derived from refuse, typically indicated by the English acronym RDF (Refuse Derived Fuel) in systems for the production of electrical energy and/or heat.

The use of RDF entails several advantages with respect to conventional fuels. In addition to the evident economic advantage, RDF allows to achieve environmental advantages, in particular by contributing to decreasing dump needs and to a so-called sustainable development.

In spite of the aforementioned potential of RDF, this fuel is employed in a very small number of applications. In particular, although in countries with more advanced industrial development there is a relatively high number of waste treatment plants for the production of RDF, by contrast there are very few combustion plants that exploit this kind of fuel, with the result that RDF frequently finds its ultimate disposal in dumps.

For instance, in Italy the potential for fuel derived from refuse production is estimated at about fifteen million tons/year, amounting to 50% of urban and equivalent waste globally produced by citizens and companies, and this situation is not radically different in other countries, be they European or extra-European. In particular, according to national estimates, the electrical energy produced through systems powered with fuel derived from refuse amounts to less than 10% of that produced using fossil fuels, and this situation is quite generalised throughout the world.

As stated above, such under-utilisation of the RDF as a renewable energy source is also due to the fact that there are few kinds of combustion plants with the capability of exploiting it.

DE 35 42 911 discloses a steam-propelled ship, wherein steam production is obtained by combustion of coal, wood waste, used oil, sludge and the like.

Therefore, the technical problem constituting the basis for the present invention is to provide a propulsion system and related method that allow to enhance the exploitation of non conventional fuel derived from refuse and/or work process scraps and to expand its sphere of application.

This problem is solved by a naval propulsion system, such as a naval propulsion system that has a heating chamber combustion unit, apt to be supplied by non conventional fuel derived from refuse and/or from work process scraps; a fuel housing, having containers apt to house the fuel in form of bales, the containers being also apt to be used to transport the bales to the location where a ship is to be loaded; an extraction unit, apt to extract the fuel in form of bales from the containers to feed it towards the combustion unit; and a reduction unit-for reducing the bales in a fluff form, arranged upstream of the combustion unit.

According to the same inventive concept, the present invention further relates to a method for naval propulsion as defined in claim 16.

In the present context, the expression "non conventional fuel derived from refuse and/or work process scraps", hereinafter for the sake of brevity referred to as CNC, means both untreated solid or liquid refuse, such as sludge, bottom residues or solvents, and solid or liquid refuse that have previously undergone a treatment, such as biomasses, in particular waste biomasses.

The present invention provides some considerable advantages.

The main advantage consists of the greater economy of naval transports with respect to propulsion with oil-derived fuels, and of a consequent possibility to raise cruising speed. An additional fundamental advantage consists of the fact that the system of the invention is absolutely eco-compatible. This entails, among other things, that the system is wholly in line with the most recent European norms.

Other advantages, characteristics and the manners of employment of the present invention shall become readily apparent from the detailed description that follows of some embodiments thereof, provided purely by way of non limiting example.

Figure 2A:
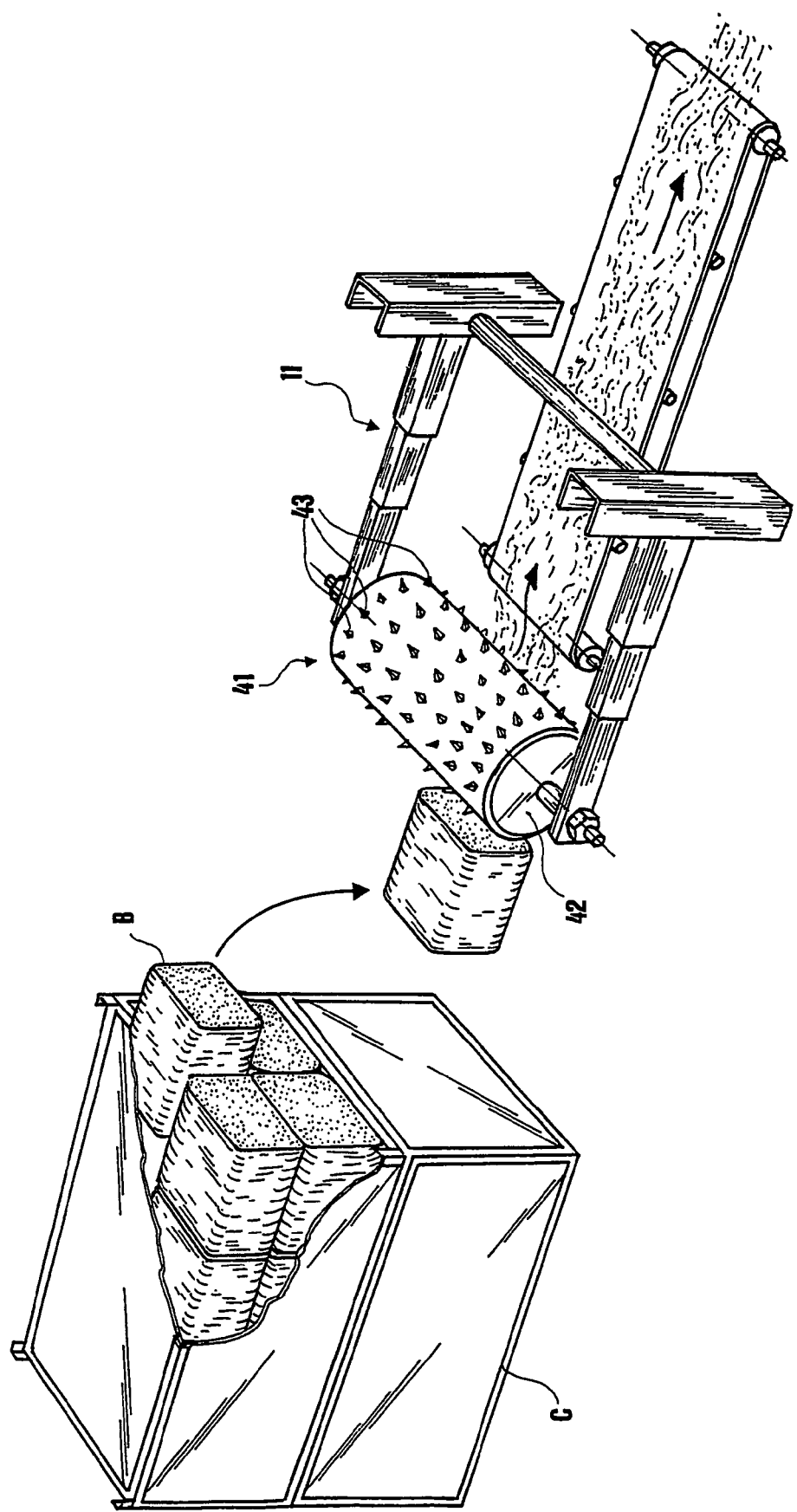

Reference shall be made to the figures of the accompanying drawings, in which:

FIG. 1 shows a block diagram of a propulsion system supplied with non conventional fuel according to the invention; and FIGS. 2A, 2B and 2C show, each, a perspective view of a respective first, second and third embodiment variation of a unit of the system of FIG. 1.

With reference initially to FIG. 1, a naval propulsion system apt to be supplied with CNC (i.e. with non conventional fuel derived from refuse and/or work process scraps, see the definition provided above) is globally indicated with the number 1. The system 1 is apt to produce thermomechanical work, and in particular steam.

In the present embodiment, the propulsion system 1 provides for the CNC to be solid and supplied in form of bales.

The system 1 comprises the following main units:

Housing means 2 for housing containers C;

An extraction unit for the extraction of bales B of CNC from the containers arranged in said housing means 2, generally indicated with the number 3 in FIG. 1;

A reduction unit for reducing the aforesaid bales in a torn form, so-called "fluff" form F, generically indicated as 4 in FIG. 1;

A transportation device 5 for feeding the CNC in fluff form to a heating chamber combustion unit 6;

The aforesaid heating chamber combustion unit 6, apt to produce superheated steam;

A fume treatment unit 7;

A unit for treating and disposing of ashes 8;

A storing unit 9 for storing liquid CNC; and

A pre-treatment unit 10 for pre-treating waste.

Each of the components introduced thus far shall now be described in greater detail, with reference to the specific embodiment disclosed herein.

First of all, as mentioned above the system 1 provides for the CNC to be supplied in the form of bales B obtained starting from triturated fuel in the form of so-called "fluff" and compacted by means of pressing. This allows, among other things, to exploit existing systems for the production of refuse derived fuel.

Moreover, it is provided that the CNC in bales is transported inside containers C to the location where the ship is to be loaded, and loaded there, still inside the containers, in the aforesaid housing means 2 of the ship itself. The latter may consist of the conventional housings already present on prior art container ships, for instance in a service space defined in correspondence with a travelling overhead crane, or movable bridge, of the ship. Preferably, said housing means 2 allows a disposition in side-by-side and superposed rows of the containers containing the CNC in bales.

It will be appreciated that the aforesaid loading operation can be performed by means of conventional systems already existing in harbours, such as forklift trucks, gantries and so on.

Naturally, variant embodiment may provide for a type of housing other than containers.

Preferably, the CNC in bales is supplied at a standard density equal to or greater than about 1000 kg/m$^3$, in conventional bale format with approximate dimensions of about (1.1×1.1×2.0) m, so as to allow stowage inside a standard 20"xx maritime container in twelve bales per container, with a net weight per container in a range of about 21 to 24 tons, i.e. within the transportability limit.

By way of example, consider that in a ship with engine power of 56,000 bhp (4,800 Teu), the estimated CNC requirement for the system 1 amounts to about 100 containers for a Livorno—New York route. Said containers can, for instance, be superposed in rows of twelve containers side-by-side and eight superposed, thereby forming a fuel supply of about 2,000 tons, sufficient to travel the route in question without any intermediate stops. Obviously, if programmed intermediate stops are planned, as is generally the case for transport ships, it is not always necessary to load all fuel needed for the entire route before sailing for the initial segment.

The aforesaid units 3 and 4, respectively for extracting CNC bales and reducing them into fluff format, are preferably of the completely automated type.

In a preferred embodiment, both said units 3 and 4 are associated with the aforementioned movable bridge of the ship, which in its general structure is wholly similar to those generally provided in traditional container ships. As is well known, said bridges are apt to slide on a pair of guides or tracks, between which is defined a service space, a part of which implements, as stated above, the aforesaid housing means 2 for the containers. In the present embodiment, the bridge is preferably apt to slide on a rail with a length of a few meters, for instance 14 m, which ends in front of the containers, in correspondence with the door side thereof.

In particular, in a first embodiment variation of the system 1, shown schematically in FIG. 2A, the unit for reducing the fuel into fluff form, in this case indicated as 41, is applied directly to the movable bridge of the ship, herein indicated as 11. Said reduction unit is based on a rolling drum or roller 42 provided with engagement elements, in particular teeth 43, apt to exert an abrasive action on the bales B and return the CNC to fluff form.

It will be understood that, since the CNC is supplied pre-triturated, only a modest mechanical action will be necessary to allow the material to "re-open" into the fluff format.

Also based on said first embodiment variation, the extraction unit instead comprises a system for opening the container doors, based on the use of a programmable robot equipped with recognition means, for instance of the optical type, for recognising the details of the container opening/closing devices.

Given the strategic role of fuel in the devised system, said robot also comprises a manual control system, remotely operated by the operator who controls its motions, aided by a closed circuit television system.

Since both the movable bridge of the ship and the door opening system described above can be implemented with known means and techniques, they need not be described further herein.

The extraction unit considered herein further comprises an extraction conveyor belt associated with said rotating roller 42. Said belt can also be replaced by an aspirator or other means suitable for the purpose.

Based on a second variant embodiment schematically shown in FIG. 2B, the extraction unit, indicated herein with the reference number 32, is based on a telescopic or other type of pliers 33, also applied onto the bridge 11. Said telescopic pliers 33, also conventional, comprises an actuation system that enables it to draw, in correspondence with the opening of the container, one or more bales at a time, and to deposit said bales on a translator device 34 of the mechanical self-overturning type or with rotating band. Said device 34 allows to deposit the extracted bales on an underlying conveyor belt 35, which supplies them to a triturating device 44 which in this case embodies the unit for reducing the fuel into fluff.

The extraction unit 32 naturally comprises also a system for opening the container doors, similar to the one described with reference to the first variant embodiment. Based on a third variant embodiment shown schematically in FIG. 2C, the extraction unit, in this case indicated with the reference number 36, is based on an expelling device of the hydraulic or worm screw type applied directly in the container, motorised or robot operated. Said device is apt to thrust the bales towards the exit of the container, which bales are then fed to a unit for reducing the fuel into fluff, consisting of a triturating device.

In all three variant embodiments described above, upstream of the unit for reducing the fuel into fluff, or integrated therewith, a de-ironing device is provided, to break and/or eliminate the metal wire that typically allows to maintain the bale pressed. Preferably, the bridge is also provided with gates provided with sheets that can be anchored around the container hold, in order to protect the containers against the elements, and in particular both against sea water/rain, and against air drafts which otherwise might carry fuel particles away.

Downstream of the extraction unit, the system 1 comprises the aforesaid conveyor device 5, consisting of a screw feeder, a conveyor belt or an equivalent means for feeding the fuel to the combustion unit 6. Alternatively, said conveyor device can be absent or be incorporated in the extraction unit itself. In the first case, as it comes out the unit for reducing the fuel into fluff, the CNC can fall directly on the feeding hopper of the combustion unit itself.

It will be understood that embodiment variations may provide for different housing means from those apt to receive containers described thus far.

The combustion unit 6 comprises a conventional heating chamber, for instance of the grid type, boiling or fluid bed type or rotating furnace type, for the production of thermal energy to be transformed into superheated steam as a result of combustion and, then, in subsequent stages of the system 1 also of conventional kind, into mechanical and/or electrical energy apt to set in motion the propulsion system of the ship.

The heating chamber is provided with an internal deflector apt to assure that fumes are kept at a temperature suitable to prevent the formation of dioxins, and preferably at 850° C. for at least 2.5 s.

Since both the heating chamber and the aforesaid subsequent stages of the system are obtained by known means, they shall not be described further herein.

The fume treatment unit 7 comprises conventional means apt to subject the fumes to a filtering and scrubbing process that removes heavy metals and combustion pollutants, in order to contain the level of pollutants below internationally set limit parameters.

In particular, the treatment unit 7 comprises a set of sleeve filters, preferably redundant to allow to conduct maintenance activities on the filters without thereby compromising the optimal operation of the scrubbing processes.

The treatment unit 7 further comprises an electrostatic precipitator for particle removal, followed by a back-flow scrubbing device that uses sea water as its main agent.

It shall be appreciated that, whereas the chimney of current naval engines is not fitted with particular elements for pollutants captation, with the system 1 and the associated process the fumes shall also be relatively much cleaner.

The ash treatment and disposal unit 8 consists of a system for collecting heavy and light ashes similar to those normally in use in waste incineration plants.

In particular, heavy ashes, which constitute non hazardous waste, are placed in appropriate containers to be disposed of and/or recycled ashore for environmental restoration processes if their chemical-physical parameters allow it, whilst light ashes are made inert to be sent, once ashore, to be recycled in systems for the production of cement artefacts.

In the present embodiment, the system of the invention further comprises the aforementioned unit 9 for storing liquid CNC, associated to a pumping system wholly similar to the one already in use for supplying conventional fuel oil. The unit 9 therefore allows to supply also fuels derived from refuse and/or work process scraps in liquid form, such as sludge, bottom residues, solvents and so on, and can comprise the normal bottom holds present on ships. However, the latter shall opportunely provided with heating means, which preferably exploit the thermal energy associated with the exhaust gases of the combustion unit 6, to maintain the viscosity of the liquid CNC within a range of acceptable values for feeding the heating chamber itself.

In this regard, it will be understood that it is simple and economical for any harbour to equip itself with tanks for storing liquid CNC, in addition to normal fuel oil tanks. Also in the present embodiment, the system 1 further comprises the unit 10 for pre-treating the waste produced aboard the ship. For treating solid waste, the unit 10 comprises a desiccation device, which preferably also exploits the residual thermal energy of the combustion unit 6, possibly an additional volume reducer, a device for the removal of ferrous material, based for instance on a magnetic principle of operation, and a device for the removal of non ferrous metal. Said unit 10 can also provide an additional compacting system of the hydraulic type.

The waste treated in unit 10 can naturally be inserted into the heating chamber, which, provided with the fume scrubbing devices illustrated above, prevents the release of pollutants. In this way, dump needs are reduced because the waste, transformed into CNC, will be used as fuel and about ⅓ of fuel oil, by weight, will be saved, contributing to the reduction of carbon dioxide from fossil sources. It will be appreciated that this constitute another important advantage of the invention with respect to disposing of the fuel other than in dumps. The waste produced aboard ship can itself be transformed into fuel and disposed of / burned. Therefore, the entire process of the invention decrease dump needs, and ⅓ of TEP is saved for each ton of reused fuel, consequently reducing $CO_2$ from fossil sources.

Based on the same inventive concept, the invention also provides a naval propulsion method that provides for the combustion of the aforesaid non conventional fuel derived from refuse and/or work process scraps to generate the motive power of the ship.

Preferably, the method provides for the production of superheated steam.

Also based to a preferred embodiment, the method in question provides for the combustion fumes to be maintained at a suitable temperature to prevent the formation of dioxins, and for said fumes to be subjected to a filtering and scrubbing process, the latter preferably performed with back-flow with sea water.

The method can also provide, similarly to what has already been illustrated above with reference to the system of the invention, a step entailing the pre-treatment of the waste produced aboard the ship for the production of said CNC. Said pre-treatment step comprises for instance, for solid waste: a desiccation phase, in which the residual thermal energy of the combustion is exploited; a ferrous material removal phase; and a non-ferrous metallic material removal phase.

Based on the method of the invention, the aforesaid CNC can be loaded aboard the ship in different forms, for instance in the form of bales reducible to fluff, as illustrated above with reference to the system of the invention, but also in the form of pellets and/or briquettes and also in "loose" form.

In the latter case, it is possible to provide, also aboard the ship, a volume reduction system with high compacting capacity, such as to reduce the fuel into briquettes or pellets aboard ship.

Since the manners of producing fuel of the kind considered thus far in all described formats will be well known to a person skilled in the art, a detailed description of said manners is not provided herein.

It will be better appreciated at this point that the invention, in the embodiments illustrated above, makes maritime transports in general less hazardous and considerably less polluting and allows to provide naval vessels with ever greater autonomy.

It will also be appreciated that the system and the method described thus far allow for an easy provisioning of the CNC both in terms of volumes, and in terms of loading systems, also on a large scale.

Moreover, since ship does not allow for liquid fuels in large quantities, in case of accident at sea, no highly polluting oil derivatives will be spilled into the sea, but solid material, polluting but easier to retrieve.

It will also be understood that the invention is easily integrated with existing structures, since usually each harbour is provided with a disposal system in close connection with the harbour authority to solve the problem of the waste off-loaded from each ship. Such systems could thus increase their activity, storing and trading CNC collected also from other operators in the same industry inland.

Moreover, in the case of a merchant ship, the size of the system of the invention are not dissimilar from normal steam heating chambers already in use and therefore no adaptation is required to the spaces that house the system itself.

Lastly, it will be better appreciated at this point that, as mentioned above, the system is completely compatible with the environment, since it allows:

i. Waste disposal;
ii. Reduction in land and air pollution;
iii. Creation of synergies with other industries (for instance, cement production plants for using ashes);
iv. Reduction of operating costs;
V. Reduction of transportation times; and
vi. The conduct of an economic activity on the basis of environmental safeguard and energy saving principles.

The present invention has been described thus far with reference to preferred embodiments. It is understood that other embodiments exist which derive from the same inventive core, all falling within the scope of protection of the claims set out below.

The invention claimed is:

1. A naval propulsion system, comprising:
   a heating chamber combustion unit, apt to be supplied by non conventional fuel derived from refuse and/or from work process scraps,
   a fuel housing, comprising containers apt to house said fuel in form of bales, said containers being also apt to be used to transport said bales to the location where a ship is to be loaded;
   an extraction unit, apt to extract said fuel in form of bales from said containers to feed it towards said combustion unit; and
   a reduction unit for reducing said bales in a fluff form, arranged upstream of said combustion unit.

2. The system as claimed in claim 1, wherein said combustion unit is apt to produce superheated steam.

3. The system as claimed in claim 1, wherein said combustion unit comprises an internal deflector apt to assure that the fumes produced are kept at a suitable temperature to prevent the formation of dioxins.

4. The system as claimed in claim 1, wherein said reduction unit comprises a rotating drum mounted on a movable bridge of the ship, having a plurality of engagement elements apt to exert an abrasive action on the fuel in form of bales.

5. The system as claimed in claim 1, wherein said reduction unit comprises a triturating device.

6. The system as claimed in claim 1, wherein said extraction unit comprises a system for opening container doors comprising a programmable robot having recognising means for recognising the device for opening/closing the containers.

7. The system as claimed in claim 1, wherein said extraction unit comprises: a telescopic pliers mounted on a movable bridge of the ship, apt to draw, at the container opening, one or more fuel bales; and a translator device of the self-overturning type, apt to receive the one or more fuel bales from said telescopic pliers.

8. The system as claimed in claim 1, wherein said extraction unit comprises at least an expelling device applied directly onto a container.

9. The system as claimed in claim 1, comprising, upstream of said reduction unit, a de-ironing device, apt to break and/or eliminate a metal wire holding a fuel bale.

10. The system as claimed in claim 1, further comprising:
    a fume treating unit for treating the fumes produced in said combustion unit, apt to subject the fumes to a filtering and scrubbing process;
    a unit for treating and disposing of the heavy and light ashes produced in said combustion unit.

11. The system as claimed in claim 10, wherein said fume treating unit comprises a sea-water back-flow scrubbing device.

12. The system as claimed in claim 1, comprising a storing unit for storing fuel in liquid form.

13. The system as claimed in claim 12, wherein said storing unit comprises heating means, apt to exploit the residual thermal energy of said combustion unit, apt to maintain the viscosity of the liquid fuel within a range of values compatible with the supply of the combustion unit itself.

14. The system as claimed in claim 1, comprising a waste pre-treating unit for pre-treating the waste produced aboard the ship, apt to produce said non conventional fuel derived from refuse and/or from work process scraps.

15. The system as claimed in claim 14, wherein said waste pre-treating unit comprises, for the treatment of solid waste: a desiccation device, apt to exploit the residual thermal energy of said combustion unit; a device for removing ferrous material; and a device for removing non ferrous metallic material.

16. A naval propulsion method, comprising a step of subjecting to combustion a non conventional fuel derived from refuse and/or from work process scraps to generate motive power of a ship,
    and further comprising the steps of:
    housing said fuel in the form of bales in containers;
    transporting said containers containing said fuel bales to a location where the ship is to be loaded;
    loading said containers containing said fuel bales on the ship; and
    reducing said fuel in a fluff form before proceeding with its combustion.

17. The method as claimed in claim 16, wherein said step of subjecting to combustion said fuel provides for the production of superheated steam.

18. The method as claimed in claim 16, wherein said step of subjecting to combustion said fuel provides for the fumes to be maintained at a suitable temperature to prevent the formation of dioxins.

19. The method as claimed in claim 16, comprising a step of subjecting the combustion fumes to a filtering and scrubbing process.

20. The method as claimed in claim 19, wherein said scrubbing process is performed in back-flow with sea water.

21. The method as claimed in claim 16, comprising a step of pre-treating the waste produced aboard the ship for the production of said fuel.

22. The method as claimed in claim 21, wherein said pre-treatment step comprises, for the treatment of solid waste: a desiccation phase, wherein the residual thermal energy of the combustion is exploited; a ferrous material removal phase; and a non ferrous metallic material removal phase.

* * * * *